US009511760B2

(12) United States Patent
Heyl et al.

(10) Patent No.: US 9,511,760 B2
(45) Date of Patent: Dec. 6, 2016

(54) METHOD FOR MONITORING DRIVES

(71) Applicant: Robert Bosch GmbH, Stuttgart (DE)

(72) Inventors: Andreas Heyl, Ludwigsburg (DE);
Astrid Rall, Leingarten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/614,074

(22) Filed: Feb. 4, 2015

(65) Prior Publication Data
US 2015/0217753 A1 Aug. 6, 2015

(30) Foreign Application Priority Data
Feb. 5, 2014 (DE) .................. 10 2014 202 032

(51) Int. Cl.
*B60W 10/06* (2006.01)
*B60W 20/00* (2016.01)
*B60W 10/08* (2006.01)
*B60W 50/00* (2006.01)

(52) U.S. Cl.
CPC ............. *B60W 10/06* (2013.01); *B60W 10/08* (2013.01); *B60W 20/10* (2013.01); *B60W 20/50* (2013.01); *B60W 2050/0006* (2013.01); *B60W 2510/0657* (2013.01); *B60W 2510/0661* (2013.01); *B60W 2510/083* (2013.01); *B60W 2510/084* (2013.01); *B60W 2540/10* (2013.01); *B60W 2710/0666* (2013.01); *B60W 2710/083* (2013.01); *Y02T 10/7258* (2013.01)

(58) Field of Classification Search
CPC ...... B60W 10/06; B60W 20/50; B60W 20/10; B60W 10/08; B60W 2510/083; B60W 2510/0657; B60W 2050/0006; B60W 2540/10; B60W 2710/083; B60W 2510/084; B60W 2510/0661; B60W 2710/0666; Y02T 10/7275; Y02T 10/6286
USPC ........................................................... 701/22
See application file for complete search history.

(56) References Cited

U.S. PATENT DOCUMENTS

| | | | | |
|---|---|---|---|---|
| 6,588,256 B2* | 7/2003 | Gassner | ................... | B60K 6/48 73/114.15 |
| 6,810,318 B2* | 10/2004 | Brooks | .............. | B60K 23/0808 180/197 |
| 2002/0029624 A1* | 3/2002 | Gassner | ................... | B60K 6/48 73/114.04 |
| 2004/0054459 A1* | 3/2004 | Brooks | .............. | B60K 23/0808 701/82 |
| 2014/0184125 A1* | 7/2014 | Fu | .......................... | H02P 21/148 318/490 |

* cited by examiner

*Primary Examiner* — Anne M Antonucci
(74) *Attorney, Agent, or Firm* — Norton Rose Fulbright US LLP; Gerard Messina

(57) ABSTRACT

A method is provided for monitoring torques, including the following steps in a first processing unit: Receiving a delta torque; in a first calculating process, calculating a first setpoint torque and a second setpoint torque from the delta torque; in a second calculating process, checking whether a difference of the first setpoint torque and of the second setpoint torque is less than, or equal to the delta torque, the second calculating process being carried out independently of the first calculating process; and output of the first setpoint torque and the second setpoint torque, only if the difference of the first and the second setpoint torque is less than, or equal to the delta torque.

12 Claims, 3 Drawing Sheets

METHOD FOR MONITORING DRIVES

FIELD OF THE INVENTION

The present invention relates to a method for monitoring torques, particularly delta torques.

BACKGROUND INFORMATION

Today's vehicles use control units for internal combustion engines, which include monitoring according to the so-called "Standardized E-Gas [FOOT drive-by-wire system or e-gas] Monitoring Concept for Gasoline and Diesel Engine Control Units". The monitoring is intended to prevent undesired vehicle behavior.

The principle of functional monitoring, in this instance, is as follows: An admissible torque is calculated which takes into account a plurality of influence variables, such as the driver's command, internal friction torque or external users. On the other hand, an actual torque is calculated from current engine variables. For this purpose, the throttle valve angle, the intake manifold pressure, the injection times, the injection pressures and the injection angles, among others, may be taken into account.

The aim of the functional monitoring is to hold the actual torque to below the admissible torque, in order to prevent undesired acceleration. Demands are, therefore, made on a monitoring concept, among other things, the observance of a certain error reaction time, so that faulty vehicle reactions, such as an undesired acceleration, remain manageable. This means that an error has to be detected and debounced within a certain time. After an unequivocal error detection, the vehicle must then be brought into a safe state.

Because of reading back actual values, the engine control unit requires a certain time for this: Thus, the actual torque must first build up, for example, and then corresponding actuator values may be read back. For Otto and Diesel engines this admitted error reaction time generally amounts to 500 ms. For the monitoring of driving dynamics longitudinally to the travel direction, this error reaction time is generally sufficient. The E-gas monitoring concept was appropriately adapted to electric motors.

Increasingly, hybrid vehicles are also produced, which combine internal combustion engines and electric motors. In hybrid vehicles, the engine control unit of the internal combustion engine is frequently used for determining a torque distribution between the internal combustion engine and the electric motor. In this case, the setpoint and actual torque of the electric motor have to be integrated into the functional monitoring. This takes place according to the same principle as with only an internal combustion engine: From the overall setpoint torque, the engine control unit calculates the setpoint torque and the controlled variables for the internal combustion engine and the setpoint torque for the electric motor. The actual values are then read back in order to calculate the actual torque. In this instance, the control unit for the electric motor calculates from its actuator values the actual torque of the electric motor and sends this to the engine control unit of the internal combustion engine.

In recent times, vehicles have also been developed which use electric motors for implementing single-wheel drives, both on the front and the rear axle. If the electric motors on one axle supply different torques for the right and the left wheel, a torque is created that is transverse to the travel direction. Torque requirements for this may originate, for example, from an ESP control unit for regulating the vehicle stability, and may be routed via the engine control unit.

This transverse torque may be used to support the steering, and consequently the vehicle behaves in a more agile manner in curves. However, erroneously supplied torques may now lead to undesired transverse dynamics, that is, to undesired directional change all the way up to the occurrence of skidding. On the one hand, this is classified as being more dangerous than an undesired longitudinal dynamics, and on the other hand, errors in the field of transverse dynamics have to be detected more quickly, since driving experiments have shown that such errors are able to lead to skidding even after times below 100 ms, for instance.

It would therefore be desirable to indicate a possibility of reducing an error reaction time for specifications which refer to the transverse dynamics of a vehicle as compared to the related art.

SUMMARY

In a method according to the present invention for monitoring torques, a first processing unit, particularly a control unit, receives a delta torque. Thereafter, in a first calculating process, a first and a second setpoint torque are calculated from the delta torque. In a second calculating process, it is checked whether a difference of the first and second setpoint torque is less than or equal to the delta torque, the second calculating process being carried out independently of the first calculating process. Provided the difference is less than or equal to the delta torque, the first and the second setpoint torque are output. Thereby a calculation of setpoint torques is checked with the aid of a specified delta torque using a second, independent calculation, i.e. a monitoring of the first calculation takes place, using which errors are able to be detected. Since the monitoring is carried out in the same processing unit as the calculation, no transmission times between several processing units or the reading back of values have to be taken into account, and a short monitoring time, that is, a short error tolerance time is achieved.

This advantageous type of functional monitoring may be employed particularly for delta torques in the transverse direction of a vehicle, i.e. for the transverse dynamics, whereby a quicker monitoring is achieved than for the longitudinal dynamics, for example.

The first and the second setpoint torque are preferably calculated from the delta torque and a third setpoint torque, the third setpoint torque being calculated from requirement values. This is useful if, as is often customary in practice, the delta torque is to be offset with another specified torque. For instance, for two electric motors, equal torques may be specified in the longitudinal direction which, however, are supposed to deviate from each other for a transverse torque. For example, in this case, this may be about an electric motor on the left side and one on the right side of a vehicle, for the right electric motor a greater torque being provided, in order to achieve a transverse torque to the left. With that, cornering is able to be supported.

During the second calculating process, during the checking, the signs of the delta torque, the first and/or the second setpoint torque are advantageously taken into account. With that, one is able to monitor even more accurately for errors since, depending on the travel situation, torques in different directions are able to have differently critical effects.

It is advantageous if the first and the second setpoint torque are output to a second processing unit, in the second processing unit an implementation of the first and second setpoint torque being checked with the aid of the actual torques aimed for from this. This occurs by the actual torque being read back after the implementation of the setpoint torques and compared to the setpoint torques. The second processing unit is usually a control unit for electric motors. Possible corrections, in this case, may quickly be achieved, since an electrical setpoint torque may be controlled more quickly compared to setpoint torques for internal combustion engines.

It is further advantageous if the delta torque is specified by a third processing unit. A delta torque is frequently required for driving dynamics regulations, so that, transversely to the travel direction, a torque acts as a support for the steering. It is therefore meaningful that the delta torque is specified by another control unit which is provided for driving dynamics regulations.

In the first processing unit, a fourth setpoint torque is preferably calculated from the requirement values, and from the fourth setpoint torque, specified values for actuators, using which the fourth setpoint torque is to be implemented, are calculated and output. Besides setpoint torques for electric motors, setpoint torques for an internal combustion engine are mostly also requested or calculated, which are then output as specified values to the internal combustion engine and associated actuators. Consequently, the calculation of all requested setpoint torques may be undertaken in one processing unit.

In this case, it is also of advantage if the actual values, which result from an implementation of the specified values and/or an actual torque, which results from an implementation of the first and second setpoint torque, are received by the first processing unit and compared to an admissible torque calculated from the requirement values. This enables an additional checking of the further setpoint torques and contributes to safety. This is used especially for torques in the longitudinal direction, i.e. for the longitudinal dynamics.

One processing unit according to the present invention, e.g. a control unit, particularly an engine control unit of a motor vehicle, is set up, particularly in terms of program technology, to carry out a method according to the present invention.

The implementation of the method in the form of software is also advantageous, since this incurs particularly low costs, especially if an executing control unit is also used for other tasks and is therefore present anyway. Suitable data carriers for providing the computer program are, in particular, diskettes, hard disks, flash memories, EEPROMs, CD-ROMs, DVDs, etc. A download of a program via computer networks (Internet, intranet, etc.) is also possible.

Further advantages and developments of the present invention derive from the description and the enclosed drawing.

It is understood that the features mentioned above and the features yet to be explained below may be used not only in the combination indicated in each case but also in other combinations or individually, without departing from the scope of the present invention.

The present invention is represented schematically in the drawings on the basis of exemplary embodiments and described in detail below with reference to the drawings.

DETAILED DESCRIPTION

Figure 1:
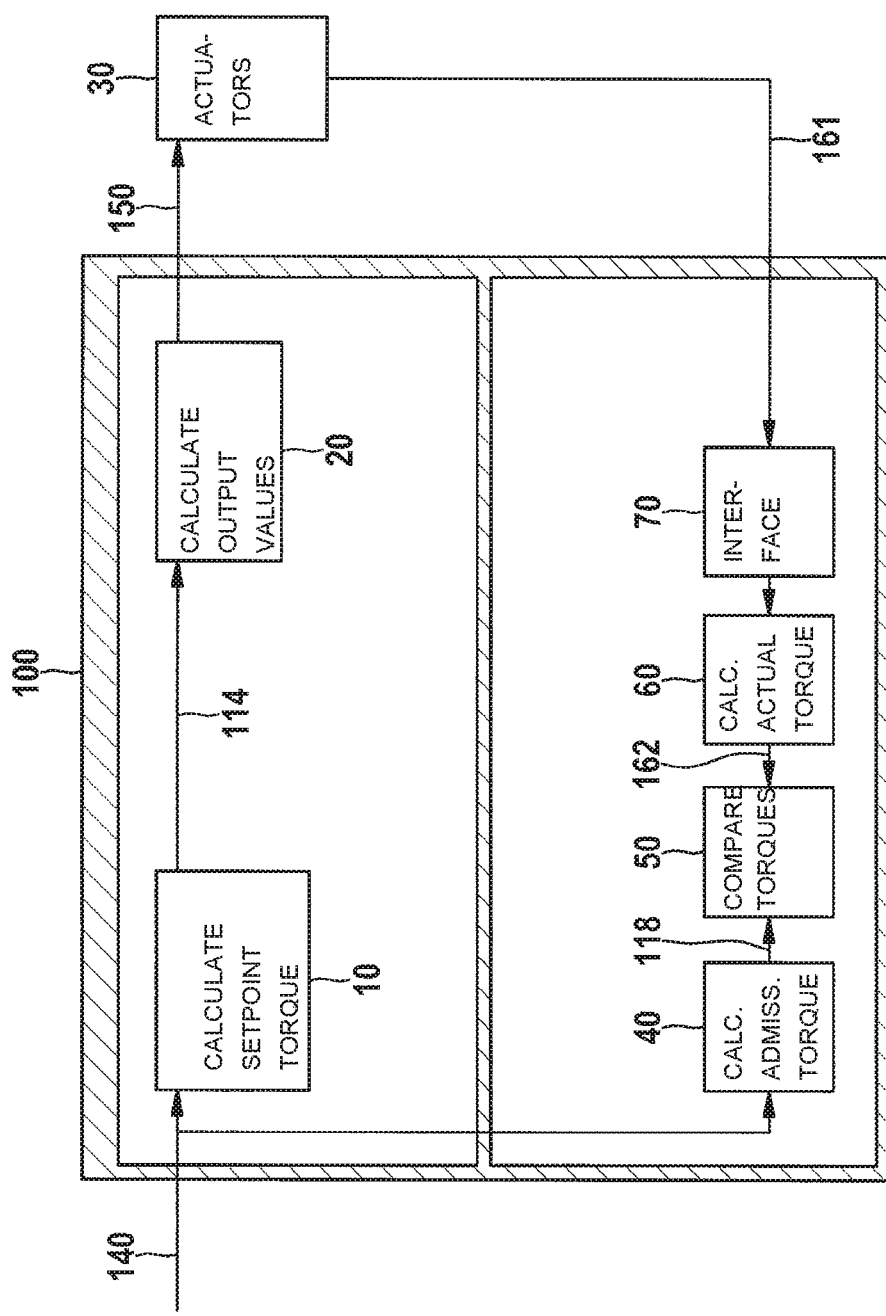
FIG. 1 shows a schematic representation of a method according to the related art.

FIG. 1 shows schematically a method of functional monitoring for an internal combustion engine according to the related art.

In this instance, a processing unit 100, usually an engine control unit, receives requirement values 140. Such requirement values may originate from an accelerator, for example, by which a driver specifies a desired torque. It is also conceivable to have additional torque requirements from other processing units, such as a control system for safe driving operation or for protecting components.

In one functional plane, in processing unit 100, from requirement values 140, in a calculating step 10 a setpoint torque 114 is calculated for the internal combustion engine. Subsequently, within the functional plane, in a calculating step 20, output values 150 are calculated from setpoint torque 114, which are provided for actuator 30, which are provided for the regulation of the internal combustion engine, such as the injection. Output values 150 are output by processing unit 100 and routed to appropriate actuators 30, such as injectors, spark plugs, etc.

In one functional monitoring plane, in processing unit 100, in addition, from received requirement values 140, in a calculating step 40, an admissible torque 118 is calculated. Admissible torque 118 represents a boundary value which must not be exceeded, based on safety specifications, for example, by setpoint torque 114. The functional monitoring plane carries out calculations independently of the functional plane.

Furthermore, actual values 161, i.e real values which actuators 30 achieve in implementing specified values 150, are read back by processing unit 100 via an interface 70. A measurement of the actual values 161 is able to take place by suitable sensors.

On the functional monitoring plane, an actual torque 162 is calculated in a calculating step 60 from the received actual values 161, which is actually achieved by the internal combustion engine. This actual torque 162 is subsequently compared to admissible torque 118 in a checking step 50 and it is checked whether the actual torque 162 lies within the required boundary value. If actual torque 162 lies beyond admissible torque 118, suitable countermeasures may be taken, such as a back-regulating of the torque of the internal combustion engine.

For this checking, however, a long error reaction time (ca. 500 ms) is available because of the output and the renewed reading back of the actual values 161.

Figure 2:
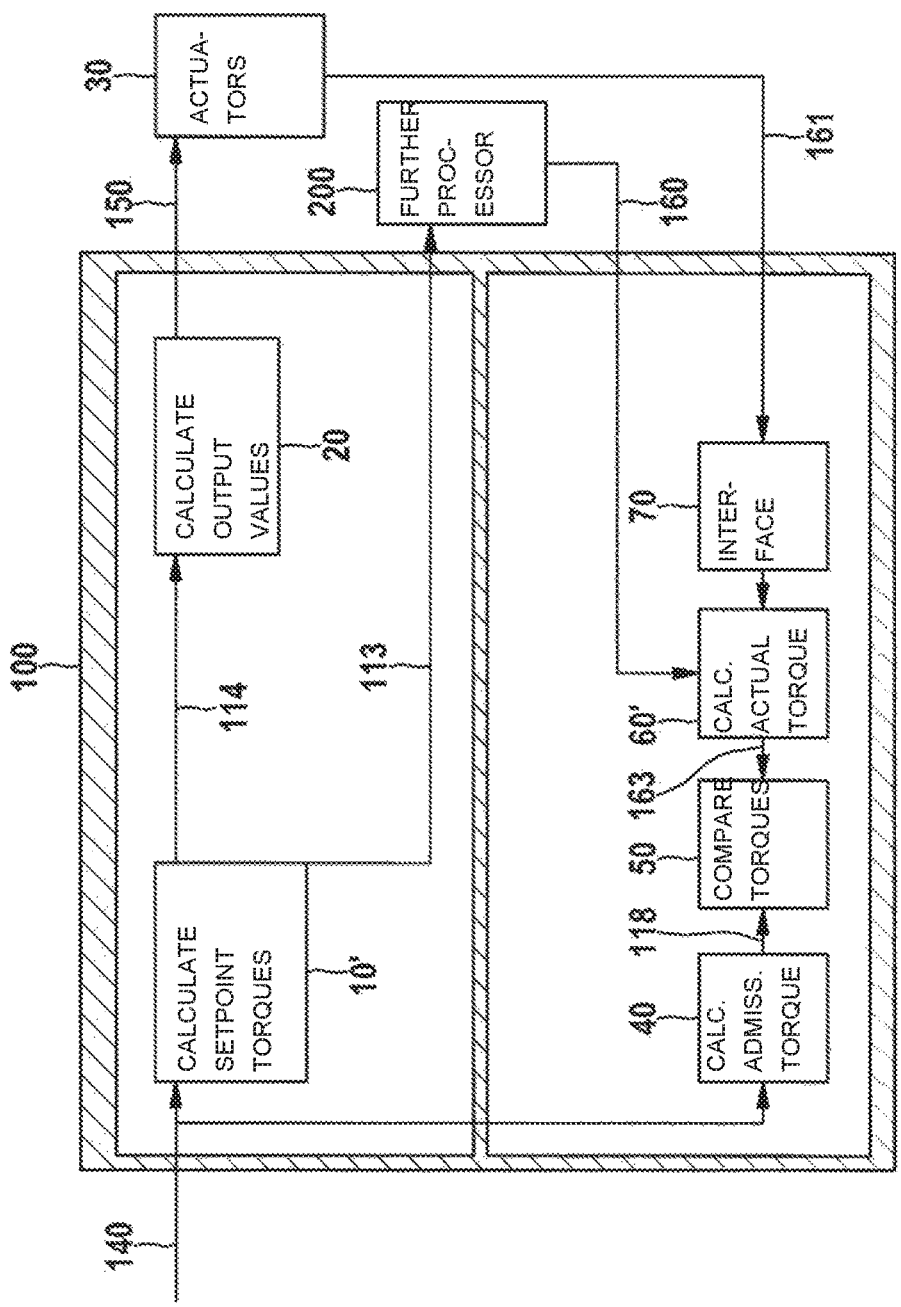
FIG. 2 shows a schematic representation of an additional method according to the related art.

FIG. 2 shows schematically a method of functional monitoring for an internal combustion engine and an additional electric motor according to the related art.

The difference from the method shown in FIG. 1 is that on the functional plane, in a calculating step 10', in addition to setpoint torque 114 for the internal combustion engine, a setpoint torque 113 for the electric motor is also calculated. This setpoint torque 113 is output by processing unit 100 without further calculations, and received by an additional processing unit 200, which is provided for the control of the electric motor. Any further necessary calculations with regard to setpoint torque 113 for the electric motor and its implementation are carried out by the additional processing unit 200.

An electrical actual torque 160 achieved by the electric motor, after having been recorded by suitable means, is read back by processing unit 100 via a suitable interface and offset against the actual torque of the internal combustion engine in a calculating step 60' to form an overall actual torque 163. Thereafter, in turn, as was also described in connection with FIG. 1, in checking step 50, the comparison takes place of, in this case, the entire actual torque 163 to the admissible torque 118.

In this case, too, a long error reaction time (ca. 500 ms) is available for the checking by the output and the renewed reading back of actual values 161 and additionally of electrical actual torques 160.

Figure 3:
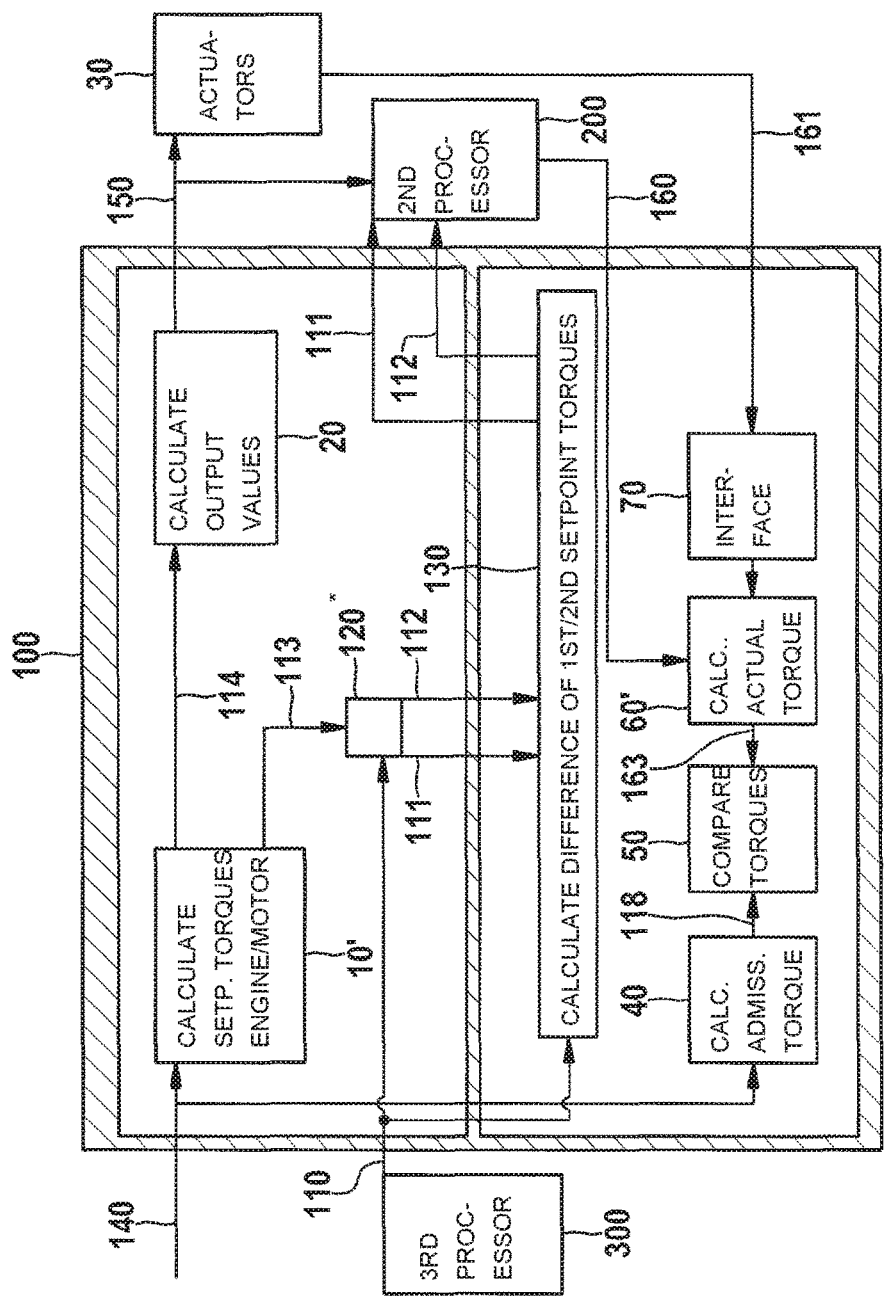
FIG. 3 shows a schematic representation for a method according to the present invention in a preferred embodiment.

FIG. 3 schematically shows a method according to the present invention, in a preferred embodiment, for a monitoring of torques.

As in the related art, requirement values 140 are received by first processing unit 100, from which, in a functional plane, in calculating step 10', a fourth setpoint torque 114 for an internal combustion engine and a third setpoint torque 113 for an electric motor are calculated.

From fourth setpoint torque 114, in turn, output values 150 are calculated and output for actuators 30.

In addition, first processing unit 100 receives a delta torque 110 from a third processing unit 300. While the requirement values 140 are provided for a calculation of torques in the longitudinal direction, that is, for regulating the longitudinal dynamics, delta torque 110 is provided for regulating the transverse dynamics.

Third processing unit 300, usually a driving dynamics control unit such as an ESP control unit, specifies a delta torque for this, i.e. different longitudinal torques are to be specified for the left and the right vehicle side which differ exactly by the delta torque. Thus a transverse torque is generated. With that, as was mentioned at the outset, a more stable and/or a more agile cornering may be achieved, for example. Such a different specification of longitudinal torques is possible, for instance, when, in each case, an electric motor is provided for the drive on both sides of the vehicle.

Now, on the functional plane, in a first calculating process 120, from the third setpoint torque 113, for the electric motors, and the delta torque 110, a first setpoint torque 111 and a second setpoint torque 112 are calculated. In this context, for example, first setpoint torque 111 is provided for an electric motor for a drive of the left vehicle side, and second setpoint torque 112 is provided for an electric motor for a drive of the right vehicle side.

The first and the second setpoint torque 111, 112 are now not yet output by processing unit 100 but first transferred to the functional monitoring plane. There, in a second calculating process 130, the difference of first setpoint torque 111 and second setpoint torque 112 is calculated. Subsequently it is checked whether this difference is less than, or equal to received delta torque 110 or whether this difference is greater than received delta torque 110. During the checking, signs are also taken into account of the delta torque as well as the first and second setpoint torque.

The first and second setpoint torque 111, 112 are subsequently only output by processing unit 100, and routed to second processing unit 200 for controlling the electric motors, when the checking has run positively, that is, when the difference was less than, or equal to the received delta torque 110. This ensures that no greater transverse torques are generated than is provided, since the vehicle could otherwise get into skidding.

This type of checking enables having a considerably shorter error tolerance time (ca. 100 ms) than the checking that is usual for the longitudinal dynamics according to the related art, since no values have to be first output and then read back again. Nevertheless, because of the two calculating processes 120, 130 carried out independently of each other in the functional plane or the functional monitoring plane, a necessary safety of the setpoint torques is guaranteed.

In addition, in second processing unit 200, monitoring of first and second setpoint torque 111, 112 is able to take place, which ensures additional safety. That is, the actual torques achieved by the electric motors, which are achieved at the implementation of first and second setpoint torques 111, 112 are detected, for instance, using suitable means, for example, read back again by second processing unit 200 and compared there to the specified first and second setpoint torques 111, 112. A possible deviation could also be corrected in this case, since a regulation of the electric motors is able to be carried out relatively rapidly.

As also in the related art, actual values 161 as well as electric actual torque 160 area read back by first processing unit 100 via interface 70, and on the functional monitoring plane an entire actual torque 163 is calculated in a calculating step 60' and compared to an admissible torque 118, whereby a monitoring of the longitudinal dynamics is ensured.

For the longitudinal dynamics, by contrast to the transverse dynamics, a longer error tolerance time of ca. 500 ms is admissible, since in this case no dangerous situations such as skidding of the vehicle, which would no longer be controllable, are able to be created.

What is claimed is:

1. A method for monitoring a torque of a vehicle, the method comprising:
   receiving, via a first processing unit, a delta torque;
   calculating, via the first processing unit, in a first calculating process, a first setpoint torque and a second setpoint torque from the delta torque;
   checking, via the first processing unit, in a second calculating process, whether a difference of the first setpoint torque and of the second setpoint torque is less than, or equal to the delta torque, the second calculating process being carried out independently of the first calculating process; and
   outputting the first setpoint torque the second setpoint torque, only if the difference of the first and the second setpoint torques is less than, or equal to the delta torque, to a second processing unit for controlling at least one electric motor, to ensure that no greater transverse torques are generated than is provided to avoid skidding by the vehicle.

2. The method as recited in claim 1, wherein the first and the second setpoint torques are calculated from the delta torque and a third setpoint torque that is calculated from requirement values for the third setpoint torque.

3. The method as recited in claim 2, wherein in the first processing unit a fourth setpoint torque is calculated from the requirement values, and from the fourth setpoint torque specified values for actuators are calculated and output.

4. The method as recited in claim 3, wherein actual values, which result from an implementation of at least one of the specified values and an actual torque, which results from an implementation of the first and second setpoint torques, are received by the first processing unit and compared to an admissible torque calculated from the requirement values.

5. The method as recited in claim 3, wherein the fourth setpoint torque is assigned to at least one of an internal combustion engine and actuators assigned to the internal combustion engine.

6. The method as recited in claim 2, wherein the third setpoint torque is assigned to at least one electric motor.

7. The method as recited in claim 1, wherein in the second calculating process, during the checking, signs of at least one of the delta torque, the first setpoint torque, and the second setpoint torque are taken into account.

8. The method as recited in claim 1, wherein:
the first setpoint torque and the second setpoint torque are output to a second processing unit;
in the second processing unit a checking of the first and the second setpoint torques is carried out with the aid of an actual torque achieved from it.

9. The method as recited in claim 8, wherein the delta torque is specified by a third processing unit.

10. The method as recited in claim 1, wherein the first and the second setpoint torques are assigned to at least two different electric motors.

11. A processing unit for monitoring a torque of a vehicle, comprising:
receiving a delta torque;
in a first calculating process, calculating a first setpoint torque and a second setpoint torque from the delta torque;
in a second calculating process, checking whether a difference of the first setpoint torque and of the second setpoint torque is less than, or equal to the delta torque, the second calculating process being carried out independently of the first calculating process; and
outputting the first setpoint torque the second setpoint torque, only if the difference of the first and the second setpoint torques is less than, or equal to the delta torque, to a second processing unit for controlling at least one electric motor, to ensure that no greater transverse torques are generated than is provided to avoid skidding by the vehicle.

12. A machine-readable storage medium having a computer program, which is executable by a processor, comprising:
a program code arrangement having program code for monitoring a torque of a vehicle, by performing the following:
receiving, via a first processing unit, a delta torque;
calculating, via the first processing unit, in a first calculating process, a first setpoint torque and a second setpoint torque from the delta torque;
checking, via the first processing unit, in a second calculating process, whether a difference of the first setpoint torque and of the second setpoint torque is less than, or equal to the delta torque, the second calculating process being carried out independently of the first calculating process; and
outputting the first setpoint torque the second setpoint torque, only if the difference of the first and the second setpoint torques is less than, or equal to the delta torque, to a second processing unit for controlling at least one electric motor, to ensure that no greater transverse torques are generated than is provided to avoid skidding by the vehicle.

* * * * *